(12) United States Patent
Volpert

(10) Patent No.: US 10,577,934 B2
(45) Date of Patent: Mar. 3, 2020

(54) TURBINE WHEEL FOR A TURBINE OF AN EXHAUST GAS TURBOCHARGER

(71) Applicant: Daimler AG, Stuttgart (DE)

(72) Inventor: Andreas Volpert, Stuttgart (DE)

(73) Assignee: Daimler AG, Stuttgart (DE)

( * ) Notice: Subject to any disclaimer, the term of this patent is extended or adjusted under 35 U.S.C. 154(b) by 40 days.

(21) Appl. No.: 15/760,919

(22) PCT Filed: Aug. 9, 2016

(86) PCT No.: PCT/EP2016/001361
§ 371 (c)(1),
(2) Date: Mar. 16, 2018

(87) PCT Pub. No.: WO2017/045738
PCT Pub. Date: Mar. 23, 2017

(65) Prior Publication Data
US 2018/0266252 A1  Sep. 20, 2018

(30) Foreign Application Priority Data

Sep. 19, 2015  (DE) .................. 10 2015 012 259

(51) Int. Cl.
*F01D 5/04* (2006.01)
(52) U.S. Cl.
CPC .......... *F01D 5/048* (2013.01); *F05D 2200/14* (2013.01); *F05D 2220/40* (2013.01); *F05D 2230/211* (2013.01); *F05D 2250/38* (2013.01)

(58) Field of Classification Search
CPC .................. F01D 5/048; F01C 6/12
See application file for complete search history.

(56) References Cited

U.S. PATENT DOCUMENTS

| | | | |
|---|---|---|---|
| 2007/0128018 A1* | 6/2007 | Sumser | F01D 5/048 415/203 |
| 2016/0003059 A1* | 1/2016 | Otsubo | F01D 5/027 416/241 R |
| 2016/0053616 A1* | 2/2016 | Scherrer | F02B 37/00 416/223 A |

FOREIGN PATENT DOCUMENTS

| | | | | |
|---|---|---|---|---|
| CH | | 674549 A5 * | 6/1990 | ............ F02B 37/001 |
| DE | 10 2008 045 171 A1 | | 3/2010 | |
| WO | WO 2006/018189 A1 | | 2/2006 | |

OTHER PUBLICATIONS

CH 674549 Machine translation, Jun. 1990.*
PCT/EP2016/001361, International Search Report dated Oct. 17, 2016 (Two (2) pages).

* cited by examiner

*Primary Examiner* — Woody A Lee, Jr.
(74) *Attorney, Agent, or Firm* — Crowell & Moring LLP

(57) ABSTRACT

A turbine wheel for a turbine of an exhaust gas turbocharger includes at least one turbine blade against which exhaust gas can flow. The maximum ratio of the wheel outlet diameter of the turbine wheel to the thickness of the turbine blade is 111.75.

6 Claims, 1 Drawing Sheet

TURBINE WHEEL FOR A TURBINE OF AN EXHAUST GAS TURBOCHARGER

BACKGROUND AND SUMMARY OF THE INVENTION

The invention relates to a turbine wheel for a turbine of an exhaust gas turbocharger.

Turbine wheels of this type for exhaust gas turbochargers are already sufficiently well-known generally from the prior art and specifically from series vehicle construction. Such a turbocharger is used, for example, in an internal combustion engine of a motor vehicle in order to provide the corresponding internal combustion engine with compressed air. In the finished manufactured condition of the respective turbine, the relevant turbine wheel is arranged in a corresponding turbine housing of the turbine, and in this configuration exhaust gas can thus flow against it and drive it. For this purpose, the turbine wheel comprises at least one turbine blade against which exhaust gas can flow. The turbine generally includes a plurality of turbine blades arranged sequentially in a circumferential direction with respect to the turbine wheel that are connected to a common hub and are thus formed as one piece with the hub.

It is known to produce the respective turbine wheel by casting, meaning by using a casting process. It has proven advantageous to manufacture the turbine wheel using a precision casting method. However, turbine wheels generally have thick turbine blades on their corresponding wheel outlet. In other words, the turbine blades of conventional turbine wheels are typically thick at the wheel outlet in order to be able to manufacture the turbine wheels by casting. Thick turbine blades, however, cause high flow losses and thus lead to a deterioration of efficiency, whereby the efficiency of the turbine as a whole is impaired.

It is therefore the object of the present invention to further develop a turbine wheel of the aforementioned type so that the turbine wheel may be manufactured by casting, specifically by precision casting, wherein an especially high degree of efficiency of the turbine can be realized using the turbine wheel.

In order to further develop a turbine wheel in such a way that the turbine wheel may be manufactured by casting, specifically by precision casting, wherein an especially high degree of efficiency of the turbine can be realized via the turbine wheel, it is provided according to the invention that a maximum ratio of the wheel outlet diameter of the turbine wheel to the thickness of the turbine blade is 111.75. The thickness of the turbine blade is referred to as the blade thickness, the wheel outlet diameter being a diameter on which or over which exhaust gas flows through the turbine wheel during operation of the turbine.

In addition, it has proven especially advantageous if the turbine blade has a maximum taper angle of 8 degrees. This means that the turbine blade is preferably angled in a radial direction from the outside inward of no more than 8 degrees. Surprisingly, it has been found that by maintaining the specified ratio, particularly in connection with maintaining the taper angle, a particularly advantageous production of the turbine wheel may be realized, specifically by casting, because, in using this ratio, in particular in connection with the taper angle, an across-the-board thickening of the turbine blade may be avoided. It is thus possible to create a geometrical optimization between thermodynamics, operational life and casting-process production so that the turbine wheel may be manufactured economically and with an especially high quality, specifically casting quality. This leads to an increase in operational life compared to conventional turbine wheels. In addition, the turbine wheel according to the invention may be produced using small amounts of materials and thus in a manner that minimizes weight and expense.

Additional advantages, features and details of the invention are shown in the following description of a preferred exemplary embodiment as well as in reference to the drawings. The features and feature combinations mentioned above in the description, as well as the features and feature combinations mentioned below in the description of the Figures and/or shown in the Figures alone may not only be used in the particular specified combinations, but also in other combinations or singly, without departing from the scope of the invention.

DETAILED DESCRIPTION OF THE DRAWINGS

The same or functionally equivalent elements are given the same reference numbers in the Figures.

Figure 1:
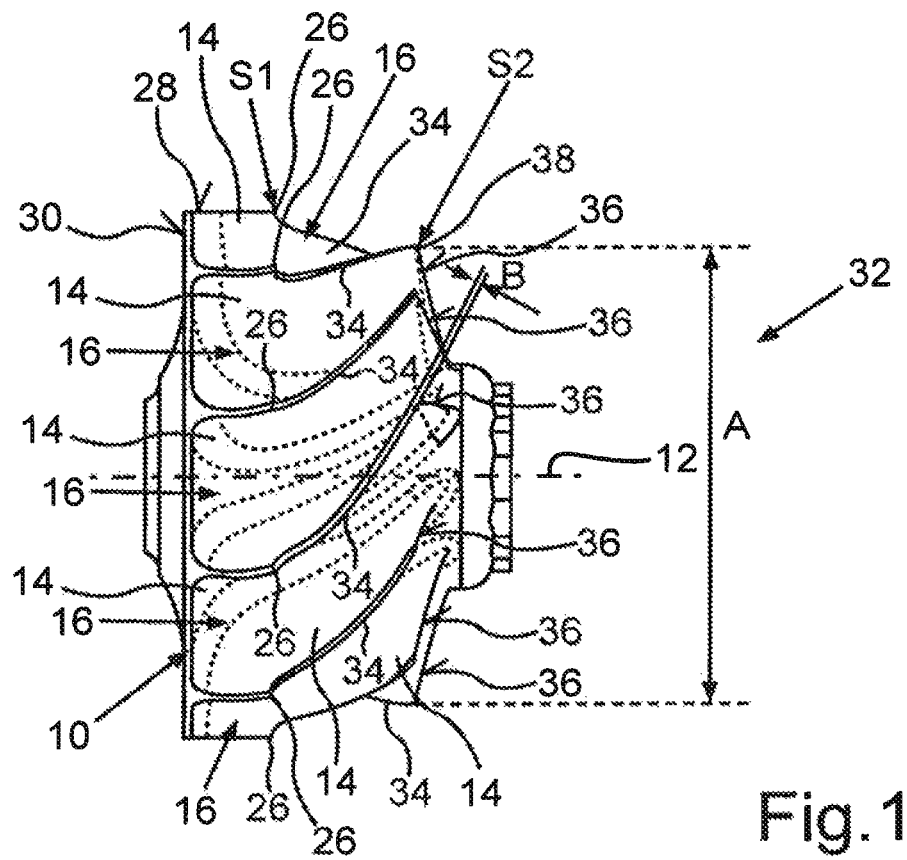
FIG. 1 is a schematic side view of a turbine wheel for a turbine of an exhaust gas turbocharger having at least one turbine blade that can be driven by exhaust gas, a maximum ratio of the wheel outlet diameter of the turbine wheel to the thickness of the turbine blade is 111.75.

FIG. 1 shows a turbine wheel for a turbine of an exhaust gas turbocharger, designated as a whole as 10, in a schematic side view. The exhaust gas turbocharger is used, for example, in an internal combustion engine, in particular a reciprocating piston internal combustion engine of a motor vehicle, specifically of a personal vehicle, and is used to supply compressed air to the internal combustion engine, in particular to at least one combustion chamber, specifically in the form of a cylinder of the internal combustion engine. To do this, the exhaust gas turbocharger includes a compressor that is arranged in an intake system of the internal combustion engine, through which air can flow. During its operation, the internal combustion engine sucks air from the environment through the intake system, via which the air can be led to or into the combustion chamber. The compressor has a compressor housing as well as a compressor wheel that is arranged in the compressor housing and can rotate around an axis of rotation relative to the compressor housing. The air that flows through the intake system and thus through the compressor or the compressor housing is compressed by the compressor wheel.

The exhaust gas turbocharger further comprises a turbine that is arranged in an exhaust system of the internal combustion engine. Air and fuel, in particular fluid fuel, are supplied to the combustion chamber so that a fuel-air mixture is created in the combustion chamber. This fuel-air mixture is burned, resulting in the exhaust gas of the internal combustion engine. The exhaust gas can flow out from the combustion chamber and into the exhaust system so that the exhaust gas is led out of the combustion chamber via the exhaust system. Accordingly, the exhaust gas can flow through the exhaust system and thus the turbine arranged in the exhaust system, wherein the turbine can be driven by the exhaust gas. For this, the turbine includes a turbine housing, in which turbine wheel 10 is arranged. Turbine wheel 10 can rotate around an axis of rotation 12 relative to the turbine housing, the axis of rotation 12 coinciding with the axial direction of turbine wheel 10 and thus of the turbine, overall. The turbine is designed as a radial turbine so that turbine wheel 10 is designed as a radial turbine wheel. This means that the exhaust gas flows against turbine wheel 10 in its radial direction during operation of the turbine. The exhaust gas is connected or led via turbine wheel 10 so that the exhaust gas flows off turbine wheel 10 in an axial direction.

Turbine wheel 10 and the compressor wheel are components of a rotor of the exhaust gas turbocharger, the rotor also including a shaft not shown in the Figures. Turbine wheel 10 and the compressor wheel are connected in a rotationally fixed manner to the rod so that the compressor wheel can be driven by turbine wheel 10 via the shaft. The air flowing through the intake system is compressed by the driving of the compressor wheel, the turbine wheel 10 being driven by the exhaust gas that flows against the turbine wheel. The energy contained in the exhaust gas can thus be used to compress the air so that an especially efficient operation of the internal combustion engine can be realized.

Figure 2:
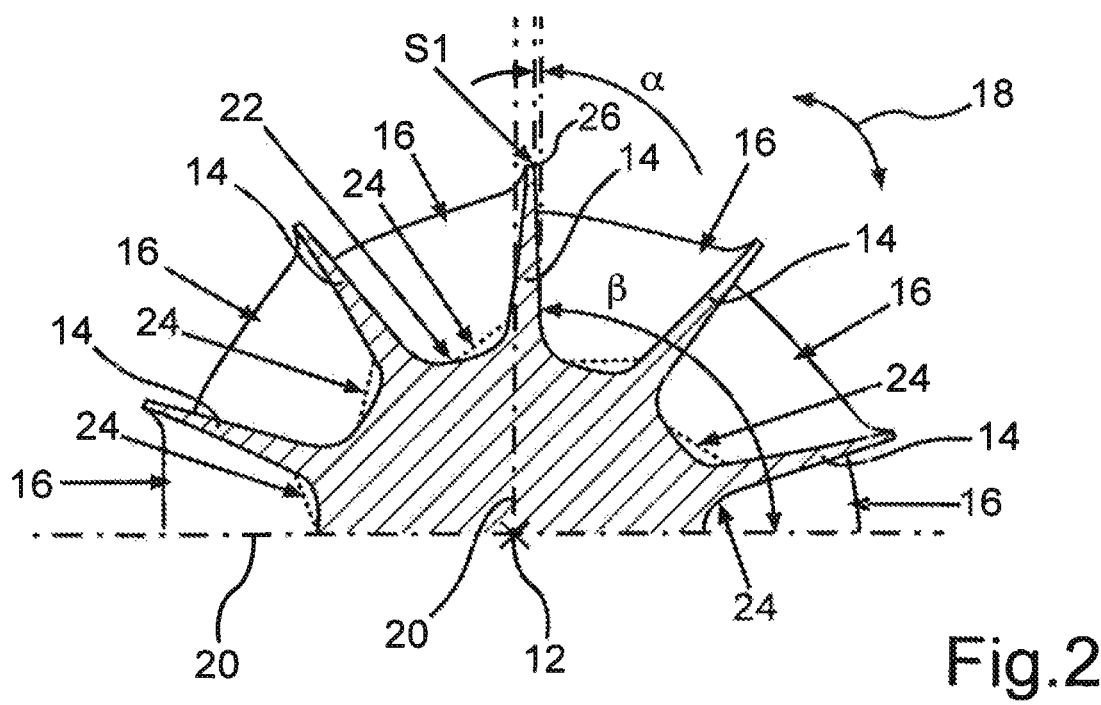
FIG. 2 is a partial schematic and cut front view of the turbine wheel of FIG. 1.

From FIGS. 1 and 2, it can be clearly seen that turbine wheel 10 includes a plurality of turbine blades 14 arranged sequentially in a circumferential direction of turbine wheel 10 that are also referred to as impeller blades. Each pair of turbine blades 14 arranged successively in a circumferential direction of turbine wheel 10 delimits a wheel channel 16 through which the exhaust gas in each case flows. The circumferential direction of turbine wheel 10 is indicated in FIG. 2 by a double arrow 18. In addition, two radials 20 are shown in FIG. 2 that run in a radial direction of turbine wheel 10.

From FIG. 2 it is also quite visible that turbine wheel 10 has a so-called hub 22, wherein turbine blades 14 are connected to the hub 22 either integral with turbine blades 14, or are mounted on hub 22. In the present case, turbine blades 14 are designed as one piece with hub 22, each turbine blade 14 having a blade root 24 by which respective turbine blade 14 transitions into hub 22. While FIG. 1 shows a schematic side view of turbine wheel 10, FIG. 2 shows a radial side view of turbine wheel 10 at a first location of respective turbine blade 14 indicated in FIGS. 1 and 2 as S1.

In order to now more advantageously produce turbine wheel 10 by casting, in particular by precision casting, as well as to be able to realize an especially high degree of efficiency of the turbine by means of turbine wheel 10, a maximum ratio of wheel outlet diameter A of turbine wheel 10 to thickness B of respective turbine blade 14 is 111.75. In other words:

$A/B \leq 111.57.$

The corresponding turbine blade also has—as is visible in FIG. 2—a taper angle α of no more than 8 degrees at first location S1, where taper angle α is also referred to as a blade taper angle. As is more closely explained below, location S1 is arranged at a wheel inlet of turbine wheel 10, the wheel inlet also being referred to as a turbine wheel inlet. In other words, it is provided on turbine wheel 10 that each turbine blade 14, particularly at first location S1, tapers in a radial direction from the outside inward at no more than 8 degrees in order to thereby realize an especially smooth blade transition from hub 22 to a point 26 of corresponding turbine blade 14. Consequently, a particularly uniform mold filling can be achieved in the precision molding.

From FIG. 1, it is clearly visible that turbine blade 14 has at least one leading edge 28, which is also referred to as an inlet edge. Leading edge 28 is at least partially, and in the present case at least predominantly, specifically fully, arranged on a so-called wheel inlet diameter of turbine wheel 10, where gas flows against or over the wheel inlet diameter of turbine wheel 10. This means that the exhaust gas flows against leading edge 28 during operation of the turbine so that exhaust gas flows across leading edge 28 against corresponding turbine blade 14 or turbine wheel 10 as a whole. Here, leading edge 28 extends parallel to the axial direction.

From FIGS. 1 and 2, it can be seen that turbine blade 14 has a taper angle α of no more than 8 degrees at point 26 of leading edge 28. In other words, point 26 is formed by leading edge 28. Turbine wheel 10 has a wheel back 30 that faces away from outlet region 32 of turbine wheel 10. The exhaust gas flows out of turbine wheel 10 via outlet region 32 during operation of the turbine. A longitudinal region 34 connects to point 26 on a side facing away from wheel back 30 in the axial direction of turbine wheel 10 and, thus, toward wheel outlet region 32, leading edge 28 transitioning via point 26 into longitudinal region 34. At this point 26, turbine blade 14 has a taper angle α.

In addition, corresponding turbine blade 14 has a trailing edge 36 that faces away from wheel back 30 and thus faces towards wheel outlet region 32. During turbine operation, the exhaust gas flows over the outlet edge of corresponding turbine blade 14 and thus out of turbine wheel 10 as a whole so that the outlet edge is also referred to as a trailing edge. Turbine blade 14 has the aforementioned thickness B at a second location S2, this second location S2 being arranged at a point 38 of the outlet edge. Longitudinal region 34 transitions via point 38 arranged at second location S2 into the outlet edge (trailing edge 36), longitudinal region 34 being arranged between points 26 and 38 and extending in particular from point 26 to point 38 or vice-versa. Point 38 is thus arranged on one of the sides located opposite blade root 24 in a radial direction, wherein—as can be seen in FIG. 1—point 38 is arranged on wheel outlet diameter A.

The ratio of wheel outlet diameter A to blade thickness B of ≤111.75 causes a particularly advantageous mold filling, especially at point 38 on the wheel outlet, so that the risk of casting errors is kept especially small and excessive production waste can be prevented.

The design of turbine wheel 10 is based on the recognition that turbine wheels are generally designed in excess of a size like that of wheel outlet diameter A. The blade thickness was heretofore not a general design criterion and was typically derived from the wheel outlet surface and wheel outlet diameter A. Using the ratio of wheel outlet diameter A to thickness B at point 38 of less than or equal to 111.75, the blade thickness as a function of wheel outlet diameter A is set and used as a design criterion. This also corresponds to the theory that a larger turbine wheel requires a correspondingly large blade thickness for casting. The following example equation for the wheel outlet diameter A1=70 Millimeter and A2=88 Millimeter is:

$B1 = 70 \text{Millimeter}/111.75 = 0.626 \text{Millimeter}$ $B2 = 88 \text{Millimeter}/111.75 = 0.787 \text{Millimeter}$ Here B1 indicates the blade thickness at point 38 for wheel outlet diameter A1, where B2 indicates the blade thickness at point 38 for wheel outlet diameter A2. In FIG. 2, an angle β is visible that is, for example, 90 degrees.

LIST OF REFERENCE CHARACTERS

10 Turbine wheel
12 Axis of rotation
14 Turbine blade

16 Wheel channel
18 Double arrow
20 Radial
22 Hub
24 Blade root
26 Point
28 Leading edge
30 Wheel back
32 Wheel outlet region
34 Longitudinal region
36 Trailing edge
38 Second point
A Wheel outlet diameter
B Thickness
S1 First location
S2 Second location
α Taper angle
β Angle

What is claimed is:

1. A turbine wheel for a turbine of an exhaust gas turbocharger, comprising:
   a turbine blade, wherein exhaust gas is flowable against the turbine blade;
   wherein a maximum ratio of a wheel outlet diameter of the turbine wheel to a thickness of the turbine blade is 111.75;
   wherein the turbine blade has a maximum taper angle of 8 degrees.

2. The turbine wheel according to claim 1, wherein the turbine blade has a trailing edge, wherein the exhaust gas is flowable over the trailing edge during operation of the turbine, and wherein the turbine blade has the thickness at a point of the trailing edge.

3. The turbine blade according to claim 2, wherein the point of the trailing edge is disposed on the wheel outlet diameter.

4. A turbine wheel for a turbine of an exhaust gas turbocharger, comprising:
   a turbine blade, wherein exhaust gas is flowable against the turbine blade;
   wherein a maximum ratio of a wheel outlet diameter of the turbine wheel to a thickness of the turbine blade is 111.75;
   wherein the turbine blade has a leading edge, wherein the exhaust gas is flowable against the leading edge during operation of the turbine, and wherein the turbine blade has a maximum taper angle of 8 degrees at a point of the leading edge.

5. The turbine wheel according to claim 4, wherein the turbine wheel has a wheel back, wherein a longitudinal region of the turbine blade connects to the point in an axial direction of the turbine wheel from a side facing away from the wheel back, and wherein the leading edge transitions via the point into the longitudinal region.

6. A turbine wheel for a turbine of an exhaust gas turbocharger, comprising:
   a turbine blade, wherein exhaust gas is flowable against the turbine blade;
   wherein a maximum ratio of a wheel outlet diameter of the turbine wheel to a thickness of the turbine blade is 111.75;
   wherein the turbine blade has a trailing edge, wherein the exhaust gas is flowable over the trailing edge during operation of the turbine, and wherein the turbine blade has the thickness at a point of the trailing edge;
   wherein the turbine blade has a leading edge, wherein the exhaust gas is flowable against the leading edge during operation of the turbine, wherein the turbine blade has a maximum taper angle of 8 degrees at a point of the leading edge, wherein the turbine wheel has a wheel back, wherein a longitudinal region of the turbine blade connects to the point of the leading edge in an axial direction of the turbine wheel from a side facing away from the wheel back, wherein the leading edge transitions via the point of the leading edge into the longitudinal region, and wherein the longitudinal region extends between the point of the leading edge and the point of the trailing edge.

\* \* \* \* \*